Patented Aug. 25, 1925.

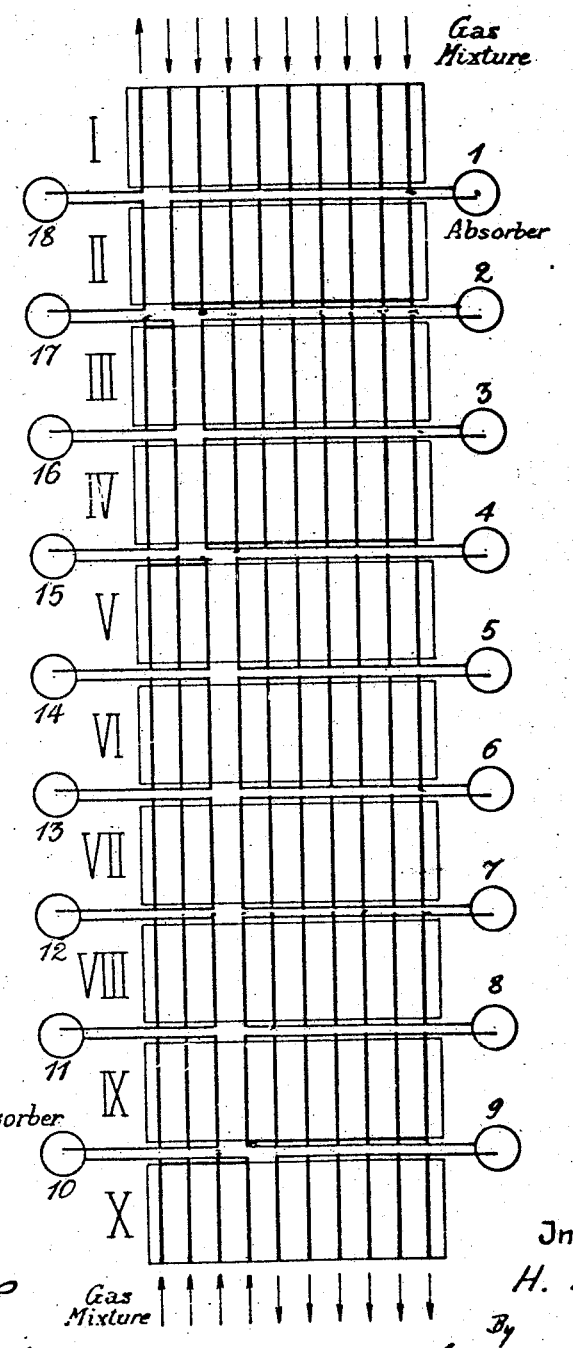

1,550,806

UNITED STATES PATENT OFFICE.

HANS HARTER, OF WURZBURG, GERMANY, ASSIGNOR TO ALBERT T. OTTO & SONS, OF NEW YORK, N. Y., A CORPORATION OF NEW YORK.

PROCESS FOR THE PRODUCTION OF AMMONIA.

Application filed August 29, 1921, Serial No. 496,478. Renewed December 23, 1924.

*To all whom it may concern:*

Be it known that I, HANS HARTER, a citizen of Germany, residing at Wurzburg, Germany, have invented certain new and useful Improvements in a Process for the Production of Ammonia (for which application was filed in Germany, May 24, 1919), of which the following is a specification.

The present invention relates to an improved process for the synthetic production of ammonia.

In the synthetic production of ammonia by the contact method an endeavour has always been made to obtain the maximum quantitative yield of ammonia with the lowest possible pressures and temperatures. As the ammonia process is exothermic, the yield decreases very considerably at an increased temperature. The gases which come into question for the production of ammonia, particularly nitrogen, are comparatively inactive. Consequently the speed of reaction, and therefore the ammonia yield are somewhat small notwithstanding the favorable equilibrium obtained at low temperatures. Since it is well known that the active condition, that is to say, the reduction of the gases to the atomic form, is very appreciably increased on the addition of thermal energy, some firms including the Badische Anilin- und Sodafabrik and Haber amongst others, resorted to the use of very high temperatures ranging from 700 to 1000° C. in their synthetic ammonia process. This employment of high temperatures is, however, only possible by simultaneously using very high pressures, such as 130 to 200 atmospheres. It is obvious therefore, that a plant of this kind which would satisfy the foregoing requirements is costly. On the other hand a very large working capital is required for such manufacturing system as the wear of the apparatus at these high pressures and temperatures is very great.

Attempts have been made, therefore, to obtain the same percentage yield of ammonia as in the process referred to above by employing lower pressures and temperatures. Up to the present, however, no process is known by means of which successful results could be obtained in practice.

According to the new process described herewith this object is attained in the following manner:—

The catalyzer is placed in contact apparatus which consists of pipes or chambers having given uniform dimensions. A certain number of such pipes are connected in series to form a battery, an absorber being inserted between each pipe. Thus the ammonia formed in each pipe will be absorbed before the gas mixture enters the next pipe. For this purpose it is of the greatest importance that the same gas mixture, that is to say, the same quantity should always be allowed to flow through the pipes connected in series without any renewal of the quantity of gas consumed in the formation of ammonia.

This is the opposite, therefore, of the circulating system in which the products subjected to reaction always remain the same quantitatively, inasmuch as the quantity of gas transformed to ammonia is always replaced after absorption.

This method of working permits an appreciable economy in power, but no increase in the yield is ever secured. Such an increase can actually be obtained, however, by means of the process according to the present invention, by allowing the same quantity of gas to pass through a number of pipes arranged in series, over the same catalyzer without renewing the gas mixture which has been transformed to ammonia, so that in each pipe the same quantity of the gas mixture is transformed to ammonia. The number of pipes to be connected in series depends of course upon the efficiency of the catalyzer, and cannot be increased up to the point at which the composition and velocity of the gas mixture would change to such an extent as to cause an appreciable reduction in the rate of yield per given capacity of plant hereinafter referred to for convenience as the "capacity time yield."

This method of working further possesses the following advantage over the circulating process. If the nitrogen-hydrogen mixture is allowed to circulate constantly in the well-known manner over the contact mass, the gas mixture transformed to ammonia being replaced each time, there will be a gradual increase in the gas mixture of constituents which have a very adverse influence on the contact material, such for example, as argon, carbon monoxide, sulphur, sulphuretted hydrogen, oxygen, carbon dioxide, methane, etc., by enriching these constituents of the gas mixture the composition of the latter itself will, on the one hand, be adversely affected for the ammonia synthesis, and what is of still greater importance, by the concentration of oxygen, carbon monoxide, sulphur and methane the contact substance will deteriorate to such an extent that it will have to be regenerated or entirely renewed. Apart from the gradual reduction in the ammonia yield owing to the presence of the above mentioned impurities in the gas mixture and contact mass, the cost for the repeated regeneration of the contact substance or the complete renewal of the same is very considerable.

These disadvantages accompanying the use of the known circulating system are entirely obviated, however, in the present process. Moreover, the technical advantages of the process as compared with the circulating system, are by no means confined to this feature.

In order to overcome to some extent the above mentioned drawbacks of the circulating system in which the quantity of transformed gas is replaced each time, special care must be taken that both the nitrogen and the hydrogen are as pure as possible. This is accompanied by very great difficulties and expense, however, particularly as regards the nitrogen which forms the greater part of the gas mixture. As electrolytic nitrogen is too expensive for the synthetic ammonia process, a form prepared from Dowson gas, water gas, producer gas, or exhaust gases must be employed; such gases, however, contain the impurities just referred to, usually in large quantities. Even when they are subjected to repeated purification it is impossible to eliminate entirely the carbon monoxide, sulphur and methane. Since, according to the present process, the gas mixture only passes once over the contact mass in the separate furnaces, so that only a slight contamination of the mass in the last two furnaces is likely to occur after some considerable time, hydrogen and nitrogen containing large quantities of impurities may quite well be employed without any fear that the contact substance will be adversely affected. By this means not only is it possible to save very considerable sums otherwise expended for the purification of the gases, but gases containing hydrogen may be employed for the ammonia synthesis the use of which would be impossible in the known process.

According to this method of working, therefore, it is possible, contrary to other processes, to increase the yield very considerably even when using low pressures.

By connecting up a number of pipes in series without replacing the quantity of gas which has been transformed the ammonia formed being absorbed in each case, a considerably higher initial velocity may be adopted than would otherwise be possible. By this means a much larger quantity of ammonia is obtained per litre contact capacity and consequently a very considerable increase in the capacity time yield, which in the practical application of the synthetic ammonia process is of the very greatest importance.

With this system of working, however, in addition to possibility of increasing the number of pipes connected in series and thus at the same time of increasing the actual output and the capacity-time yield, the length of heating surface for the separate pipes may also be made very much greater, whereby an increase in the material yield is also attained without any danger being incurred in consequence of the high velocity, that the dissociation temperature of the ammonia in the separate pipes will be exceeded.

The process described above possesses the one disadvantage however that the velocity in the different furnaces is not uniform and, particularly, in the last stages, is very low. This unequal velocity in the separate contact furnaces appreciably increases the difficulty of obtaining exact temperature regulation. Even on the assumption, however, that a somewhat higher temperature than necessary would not affect the ammonia yield, this method of working would nevertheless be accompanied by a very bad thermal efficiency, since a large quantity of heat would be uselessly lost in the separate furnaces. A further disadvantage is found in the fact the capacity-time yield and thus the quantity of ammonia produced in a given period of time, constantly decreases, even when the other conditions remain constant, owing to the constantly decreasing gas velocity. Not only can these drawbacks be eliminated entirely by the method described herewith but the quantity of ammonia obtained in the given period of time is nearly doubled with the same number of contact furnaces. Assuming for example that 50 contact furnaces each having 10 contact pipes arranged in series are employed, the quantity of gas flowing through at the outset per pipe and per hour is 50 cm. that is 500 cm. per furnace. The ammonia yield per pipe is assumed to be 2%. The novelty of the process consists in maintaining the initial gas velocity in all of the 50 furnaces the same value without replacing the quantity of gas transformed in the separate furnaces. This result is obtained in a simple manner the gas mixture after leaving the separate furnaces and absorbers, only being allowed to enter such a number of pipes that the hourly quantity of gas flowing through the separate pipes notwithstanding the quantity of gas transformed to ammonia is 50 cm. after the absorption of this quantity; it does not fall so low, however, that the capacity-time yield becomes unfavorable.

The different furnaces are designated by the numbers I, II, III, etc., and are shown by rectangles drawn in thin lines, whereas the pipes and their connections are shown by thicker lines. In order to obtain substantially the same gas velocity in all the pipes, as described above, a given quantity of gas for example 500 cm. per hour is passed through nine pipes of the furnace I and nine pipes of the furnace II, then however, through only eight pipes of the furnaces III, IV and V through seven pipes of the furnaces VI to IX, in six pipes of the next furnaces and so on, until the gas only passes through one pipe in the last furnace. The same quantity of gas will be passed in the opposite direction through the remaining pipes, namely, through nine pipes of the last furnace and the one preceding it, from here through eight pipes of the third, fourth, and fifth furnaces from the end and so on, until the gas only enters one pipe of the furnace I. The direction of the gas is indicated in the drawing by arrows. In the drawings the means for separating the $NH_3$ between the furnaces is indicated by the absorbers 1–18 inclusive. By this means the velocity in all the separate pipes and furnaces is substantially the same. This method of operation would have the result however that the number of pipes for each furnace would vary considerably so that the thermal efficiency of the separate furnaces would be poor. In order to meet this difficulty the same number of pipes are employed in each of the 50 furnaces, in our example 10 pipes in each case. These are connected as shown diagrammatically in the accompanying drawing. By this means furnaces are obtained having the same number of contact pipes in which nearly the same gas velocity always prevails. The advantages of this new process are very considerable. On the one hand the heating of all the furnaces is quite uniform as practically the same quantity of gas has always to be heated in all the furnaces. Further in the same period nearly double the quantity of ammonia is obtained, since at the same time and with the same number of furnaces not 500 but nearly 1000 cm. gas mixture are transformed to ammonia. Further the economy in power is very great, as contrary to the former system, only about 100 to 120 cm. have to be raised from 0 to 60 atmospheres. In consequence of the fact that in the same time practically double the quantity of gas mixture is transformed to ammonia, a smaller number of furnaces and less apparatus are required.

It will be noted that the gas mixture flows along a path, successive spaced sections of which include the contact chambers in which the mixture is subjected to the action of heat and the catalyst. The reduction in the number of pipes in successive sections of the path in effect decreases the total cross-sectional area of the path so that the velocity of flow may be maintained substantially constant even though the volume of the gas decreases at successive points along the path.

I claim:—

1. The process of producing ammonia from its elements comprising conducting a mixture of hydrogen and nitrogen under a pressure not exceeding 60 atmospheres through a plurality of contact chambers arranged in successive furnaces and removing the ammonia formed in each contact chamber from the gas mixture before its entry into the next chamber without replacing the quantity of gas mixture transformed to ammonia.

2. The process of producing ammonia from its elements comprising conducting a mixture of hydrogen and nitrogen through a plurality of contact chambers arranged in parallel in successive furnaces, the number of chambers decreasing arithmetically in the successive furnaces whereby the velocity of the gas mixture through the various contact chambers is substantially the same.

3. The process of producing ammonia from its elements, comprising conducting a mixture of hydrogen and nitrogen along a path under a pressure not exceeding 60 atmospheres, subjecting the mixture to the action of heat and a catalytic agent in a plurality of spaced successive sections along said path, and removing from the path at points between said sections the ammonia formed in the preceding section, and without replacing the quantity of gas mixture transformed to ammona.

4. The process of producing ammonia from its elements, comprising conducting a mixture of hydrogen and nitrogen along a path, subjecting the mixture to the action of a catalyst in spaced successive sections of the path, and removing from the path at a point in advance of each section the ammonia formed in the preceding section, the total cross-sectional area of the path decreasing from the entrance end to the outlet end at a rate approximately dependent upon the amount of mixture transformed into nitrogen at each section, whereby the velocity of the gas mixture is substantially the same in all of said sections.

In testimony whereof I affix my signature.

HANS HARTER.